A. P. BRUSH.
ANTIFRICTION BEARING.
APPLICATION FILED AUG. 21, 1920.
1,426,353.
Patented Aug. 22, 1922.
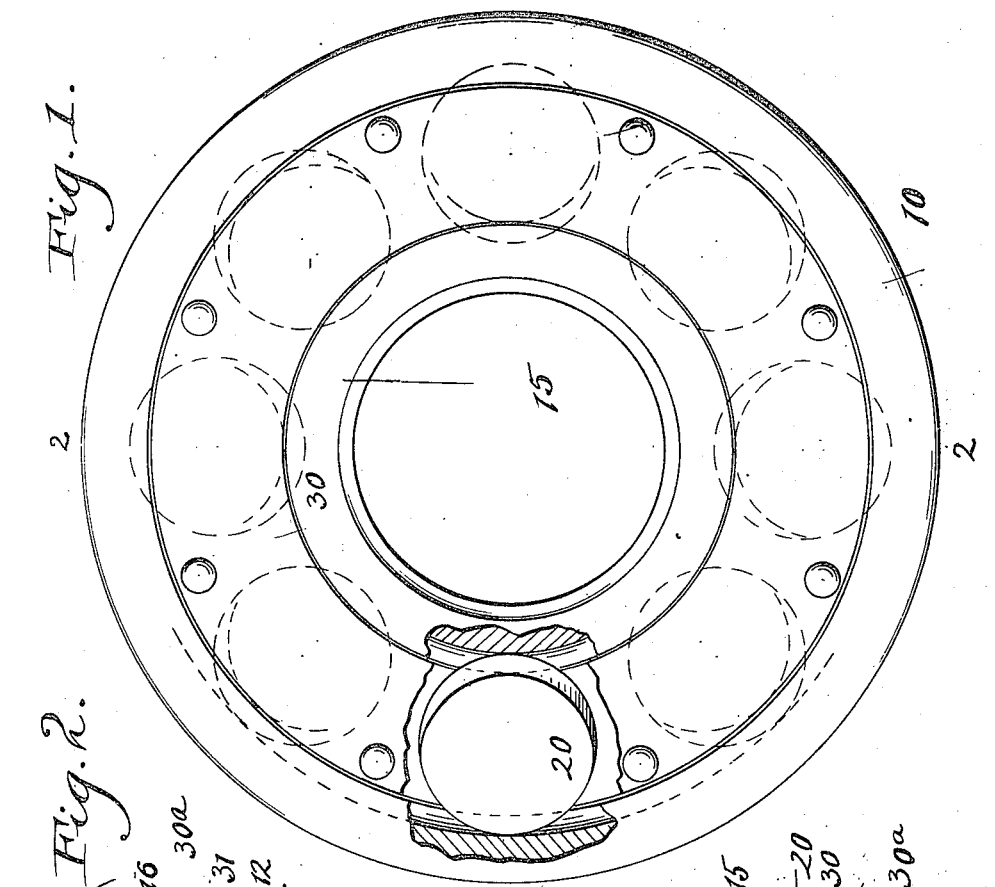
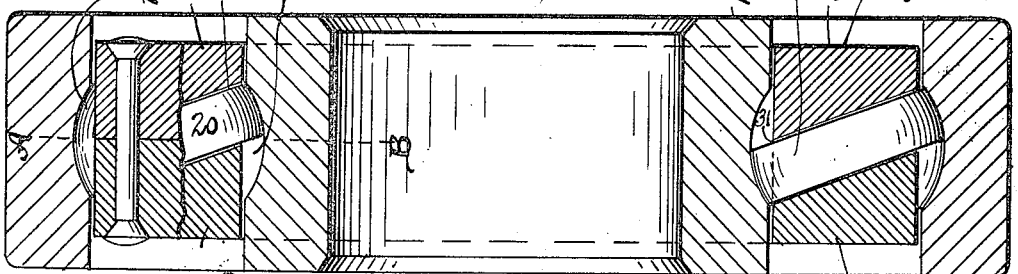
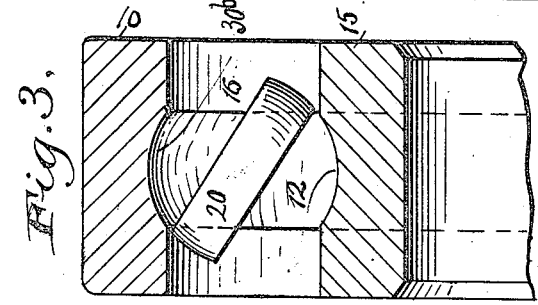
Inventor
Alanson P. Brush
by Thurston Kwis & Hudson
Attorneys

UNITED STATES PATENT OFFICE.

ALANSON P. BRUSH, OF DETROIT, MICHIGAN.

ANTIFRICTION BEARING.

1,426,353.  Specification of Letters Patent.  Patented Aug. 22, 1922.

Application filed August 21, 1920. Serial No. 405,105.

*To all whom it may concern:*

Be it known that I, ALANSON P. BRUSH, a citizen of the United States, residing at Detroit, in the county of Wayne and State of Michigan, have invented a certain new and useful Improvement in Antifriction Bearings, of which the following is a full, clear, and exact description.

The object of this invention is to produce an efficient, durable and relatively inexpensive self-contained anti-friction ring bearing adapted to carry not only radial loads, but end thrusts or axial loads in both directions, or any possible combination of such loads.

The invention consists in the construction and combination of parts shown in the drawing as hereinafter described and pointed out definitely in the appended claims.

In the drawing, Fig. 1 is a side elevation of a bearing in which the invention is embodied, a part of the two bearing rings and of the cage ring being broken away; Fig. 2 is a section of the bearing in a plane indicated by line 2—2 on Fig. 1, and Fig. 3 is a radial section through one side of both bearing rings showing them in the relation they occupy, and showing the manner in which the rollers may be introduced into operative position.

The raceway includes an outer bearing ring 10, and an inner bearing ring 15, the latter ring being disposed coaxially within the outer ring. In the outer periphery of the inner ring is a continuous annular groove 12 which forms the inner raceways for the rollers to be presently referred to. In the inner periphery of the outer ring is an opposed annular groove 16, which forms the outer raceways for said rollers.

A plurality of inclined anti-friction rollers 20 are disposed at equal distances apart, around the axis of the rings. Each roller extends across the annular space between the rings, and has peripheral engagement with the raceways in both rings. In the best construction, as shown, these rollers are inclined to such a degree that the line of peripheral contact between each roller and the raceway of the inner ring lies at one side of a plane, indicated by A—B in Fig. 2, which is normal to the axis of the rings; while the line of peripheral contact between the rollers and the raceway in the outer ring lies wholly on the opposite side of said plane. The alternate rollers are similarly inclined in one direction, while the intermediate rollers are similarly inclined in the opposite direction. One set of rollers, therefore, supports half of the radial load and end thrust or axial load in one direction, while the other set of rollers supports half the axial load or end thrust tending in the opposite direction.

The drawing shows what is now believed to be the best embodiment of this invention. In that construction, each of the rollers is an equatorial section of a sphere. The raceway grooves in the opposed faces of the two bearing rings, in radial section, are in the form of arcs of a circle having substantially the same radius.

In order to assemble the rollers in operative position between the two bearing rings, these rings are first placed in coaxial relation as described. Then, as shown in Fig. 3, a roller is introduced edgewise into the annular space between the two rings, and is then twisted around its own axis until its edges enter the two curved raceways,—at which time the roller will have peripheral engagement with the raceways in both rings. The rollers, as they are so introduced are alternately inclined in opposite directions as shown.

The rollers are kept in spaced relation by a cage ring 30 which lies and is freely movable in the annular space between the two bearing rings; and it contains recesses 31 in which the rollers are loosely fitted, and from which they project for engagement, as described, with the raceways in the bearing rings. The cage ring as shown is formed of two halves 30ª, 30ᵇ,—and the roller holding recesses are formed in the meeting faces of these halves.

Having described my invention, I claim:—

1. An anti-friction ring bearing comprising, in combination, an outer bearing ring, and an inner bearing ring arranged coaxially within the outer bearing ring, which bearing rings have in their opposed cylindrical surfaces continuous raceway grooves, a row of anti-friction rollers which extend across the annular space between the rings and have peripheral engagement with the raceways of both rings, said rollers being alternately inclined in opposite directions with respect to a plane normal to the axis of said rings, and means to maintain said rollers in spaced relation and in the inclined positions specified comprising a cage ring between said bearing rings and composed of two annular members provided on their adjacent faces with recesses in which the rollers are confined and loosely fitted, the recesses for successive rollers being oppositely inclined.

2. An anti-friction ring bearing comprising, in combination, an outer bearing ring, and an inner bearing ring arranged coaxially within the outer bearing ring, which bearing rings have in their opposed cylindrical surfaces continuous raceway grooves, a row of anti-friction rollers which extend across the annular space between the rings and have peripheral engagement with the raceways of both rings, said rollers being alternately inclined in opposite directions with respect to a plane normal to the axis of said rings, and a cage ring which is freely movable in the annular space between said rings and is formed with alternately disposed oppositely inclined recesses in which said rollers are confined and loosely fitted.

3. An anti-friction ring bearing comprising, in combination, an outer bearing ring, and an inner bearing ring arranged coaxially within the outer bearing ring which bearing rings have in their opposed cylindrical surfaces continuous raceway grooves, a row of anti-friction rollers which extend across the annular space between rings and have peripheral engagement with the raceways in both rings, said rollers being alternately inclined in opposite directions with respect to a plane normal to the axis of said rings, the inclinations of said rollers being such that the lines of contact between the periphery of each roller and the raceways of the two rings lie on opposite sides of said plane, and means to maintain said rollers in spaced relation and in the inclined positions specified and a cage ring which is freely movable in the annular space between said rings and is formed with alternately disposed oppositely inclined recesses in which said rollers are confined and loosely fitted.

4. An anti-friction ring bearing comprising, in combination, an outer bearing ring, and an inner bearing ring arranged coaxially within the outer bearing ring, which bearing rings have in their opposed cylindrical surfaces continuous raceway grooves which in radial section are arcs of the same circle, a row of anti-friction rollers each of which is an equatorial segment of a sphere having substantially the same radius as the circle above mentioned, which rollers extend across the annular space between the rings and have peripheral engagement with the raceways in both rings said rollers being alternately inclined in opposite directions with respect to a plane normal to the axis of said rings, and means to maintain said rollers in spaced relation and in the inclined positions specified.

5. An anti-friction ring bearing comprising, in combination, an outer bearing ring, and an inner bearing ring arranged coaxially within the outer bearing ring, which bearing rings have in their opposed cylindrical surfaces continuous raceway grooves which in radial section are arcs of the same circle, a row of anti-friction rollers each of which is an equatorial segment of a sphere having substantially the same radius as the circle above mentioned, which rollers extend across the annular space between the rings and have peripheral engagement with the raceways in both rings said rollers being alternately inclined in opposite directions with respect to a plane normal to the axis of said rings, a cage ring which is freely movable in the annular space between the rings and which is formed of two connected halves,—the meeting faces of which lie substantially in the above mentioned plane normal to the axis of the ring, and said meeting faces being formed with recesses in which said rollers are confined and loosely fitted.

In testimony whereof, I hereunto affix my signature.

ALANSON P. BRUSH.